Patented Aug. 4, 1953

2,647,922

UNITED STATES PATENT OFFICE 2,647,922

PURIFICATION OF α-CHLOROACRYLIC ACID ESTERS

William O. Ney, Jr., Somerset Center, Mass., assignor to General Aniline & Film Corporation, New York, N. Y., a corporation of Delaware No Drawing. Application January 15, 1951, Serial No. 206,117

7 Claims. (Cl. 260—486)

This invention relates to a method for the removal of impurities from monomeric esters of α-chloroacrylic acid, which cause discoloration of polymers prepared from the corresponding monomers.

As disclosed in U. S. patent application Serial No. 601,342, filed June 23, 1945, esters of α-haloacrylic acids are subject to autooxidation on exposure to air or other oxygen-containing gases, whereby autooxidation products apparently including oxalyl ester halides are formed, such autooxidation products causing discoloration of the polymers obtained upon polymerization of the monomer. Such discoloration appears in the polymer either initially or upon exposure of the polymer to light, heat, or atmospheric influences. Since the autooxidation products are themselves colorless, their color-forming effect is apparently due to secondary reactions thereof with the monomer or the resulting polymer.

It is quite difficult in practice to prepare monomeric α-haloacrylic esters without exposing them to air or similar oxidizing influences at some stage of their preparation. Removal of resulting autooxidation products by fractional distillation is impractical, since these impurities boil at temperatures of the same order as the monomers in which they are formed. Accordingly, it was proposed heretofore to prevent discoloration of polymers obtained from α-haloacrylic esters by incorporating in the monomer, a minor amount of a discoloration inhibitor (e. g. methanol) which converted color-forming autooxidation products to inactive materials. While such treatment is effective to avoid discoloration, the introduction of foreign substances tends to lower the softening point of the resulting polymer, and is sometimes undesirable when maximum hardness and heat resistance is desired.

It is an object of this invention to provide a method for removing from monomeric esters of α-chloroacrylic acid, impurities of the aforesaid nature which generate color in the corresponding polymer, without addition of discoloration inhibiting reagents, and thus to provide a process for producing colorless, color-stable, hard, transparent mass polymers of the aforesaid esters.

It has now been discovered, according to this invention, that polymer discoloring impurities formed by autooxidation can be readily removed from monomeric esters of α-chloroacrylic acid in a convenient and economical manner, for example, from a crude monomer obtained by dehydrochlorination of the corresponding ester of α,β-dichloropropionic acid, by subjecting the α-chloroacrylic ester to freezing temperatures so as to convert the major portion of the impure ester to a solid, and separating a liquid fraction amounting to at least 5% of the mixture (and containing the contaminating impurities) from the solid fraction of the mixture (which constitutes the purified ester). This can be done by completely freezing the crude or impure ester monomer, allowing the resulting solid to melt in part, and removing the molten portion from the solid portion. It can also be effected by partially freezing the impure liquid monomer, and separating the mother liquor containing the impurities from the frozen solid constituting the pure ester. The solid fraction of the monomer can then be melted and polymerized while protecting it from air and similar oxygen-containing gases, to a hard, colorless, color-stable polymer.

It is noted that the aforesaid fractionation of the impure ester-monomer by partial freezing or partial melting and separation of the liquid fraction, does not effect a complete purification of the ester. For example, upon steam distillation of methyl α-chloroacrylate from a dehydrochlorination reaction mixture of the type described in U. S. Patent 2,476,528 (in which methyl α,β-dichloropropionate is heated with aqueous sodium acetate) and drying the organic water-immiscible portion of the distillate over a water-absorbing material such as anhydrous sodium sulfate or magnesium sulfate, the crude ester mixture obtained may contain only about 85% of methyl α-chloroacrylate and 3 to 4% of methyl α,β-dichloropropionate. On partly freezing such a mixture and separating about one-fourth of the total amount as a liquid, it has been found that the proportion of methyl α-chloroacrylate is increased in the solid fraction by about 1%. Nevertheless, despite the relatively high proportion of impurities remaining in the resulting composition, it has been found that the melted monomer no longer contains discoloration promoting impurities, and if polymerized in the absence of air or similar oxygen-promoting agencies, the solid fraction of the crude monomer yields a colorless polymer which is stable to discoloration.

My invention is illustrated in the following examples, wherein parts and percentages are by weight.

*Example 1*

1000 parts of crude methyl α-chloroacrylate were prepared by heating methyl α,β-dichloropropionate with an aqueous solution containing a molecular excess of sodium acetate at boiling temperatures under reflux for 3 hours. The water-immiscible organic portion of the reaction mixture was separated from the aqueous portion thereof, washed with aqueous sodium bicarbonate solution to remove acetic acid and then with water. The resulting crude ester was dried over anhydrous sodium sulfate and fractionally distilled under reduced pressure. Monomeric methyl α-chloroacrylate thus obtained was completely frozen by cooling in a methanol-solid carbon dioxide bath, and then allowed to stand without cooling until about one-half of the solid had melted. The liquid portion of the mixture was decanted from the solid, and the latter allowed to melt. Samples of both portions were transferred, while protecting them from air or oxygen-containing gases, into glass tubes, and exposed to ultraviolet light until polymerization was complete. The polymer obtained from the solid fraction was clear and transparent, and was stable to discoloration on exposure to prolonged irradiation with actinic light as well as protracted heating. It was found to have a heat-distortion temperature of 125° C. The polymer obtained from the separated liquid fraction of the frozen condensate, when similarly polymerized, yielded a polymer having a yellow coloration and a heat-distortion temperature of 116° C.

*Example 2*

2500 parts of methyl α-chloroacrylate were prepared by heating methyl α,β-dichloropropionate with a molecular excess of sodium adipate in aqueous solution, to boiling temperature under reflux. The reaction mixture was subjected to steam distillation, whereby crude methyl α-chloroacrylate was collected as a water-immiscible fraction of the distillate. After separating the crude ester from the aqueous condensate, it was dried over anhydrous magnesium sulfate. Upon analysis, the resulting crude ester was found to contain 84.3% of methyl α-chloroacrylate and 3.5% of methyl α,β-dichloropropionate. While protecting the crude monomer from contact with air (by maintaining it in an atmosphere of nitrogen), the liquid product was cooled with agitation, employing a mixture of methanol and solid carbon dioxide as the cooling medium, until agitation became difficult because of the accumulation of solids in the liquid. The mother liquor was filtered off, and after remelting the solid fraction, the latter was again partly frozen in the same manner and a second portion of mother liquor filtered off. The total liquor fractions thus removed amounted to 700 parts. On analysis, the solid fraction remaining after the second freezing operation was found to contain 85.5% of methyl α-chloroacrylate and 2.3% of methyl α,β-dichloropropionate. The ultraviolet transmission (at 3100 Å. units) of a 10 cm. layer of the solid fraction obtained as described above was 79.8% while that of the crude ester before freezing was 62.5%. 0.02 to 0.03% of ditertiary butyl peroxide was introduced into each fraction of the monomer thus obtained, and the resulting compositions were placed in glass tubes and polymerized by gradually heating at 120° C. The polymer obtained from the melted solid fraction was free of color, while that obtained from the mother liquor was found to be yellow.

The polymers obtained from the solid fraction of the monomer after separation of the liquid fraction thereof in the manner described above are not only colorless but are color-stable when exposed to light, heat, and atmosphere. It was surprising to find that the purification effected by the "freezing-out" treatment of this invention eliminated color-forming materials despite the fact that the frozen fraction of the monomer still contained substantial amounts of other impurities.

Instead of methyl α-chloroacrylate employed in the foregoing examples, other esters of α-chloroacrylic acid can be similarly purified, e. g. ethyl, propyl, isopropyl, butyl, amyl, isoamyl, n-hexyl, octyl, and lauryl esters of α-chloroacrylic acid. Similarly, unsaturated esters such as allyl, methallyl, crotyl and chloroallyl esters, as well as polyhydric alcohol esters such as those of mono-, di- or tri-ethylene glycol, aromatic, araliphatic, and heterocyclic esters such as cyclohexyl, furfuryl, phenyl, cresyl, benzyl, and similar esters, of α-chloroacrylic acid can be purified by the process of this invention. The present process is especially useful for purification of the esters of lower monohydric alcohols, especially those containing 1 to 4 carbon atoms.

Depending upon the extent of contamination with autooxidation products, the proportionate fraction of the crude ester separated in liquid form from the solid frozen fraction can vary from 5 to 50% of the total amount of crude ester. Successive freezing and liquid separation treatments, in which the solid fraction obtained in each treatment is further melted, or remelted and partially refrozen with separation of another liquid fraction in each stage results in further purification of the ester-monomer. Thus, in the procedure of Example 1, the purified solid residue remaining after the first partial melting and liquid separation can be allowed to melt further, with separation of a second liquid fraction. In the procedure of Example 2, the solid obtained in partial freezing and separation of the mother liquor can be remelted, once more partly frozen, and a second mother liquor fraction removed. By carrying out purification thus, in successive stages, the amount of impure liquid fraction separated to attain a given degree of purification is less than in a single treatment.

Variations and modifications which will be obvious to those skilled in the art, can be made in the foregoing procedures without departing from the spirit or scope of the invention.

I claim:

1. A process for removing color-generating impurities from an ester of α-chloroacrylic acid, which comprises subjecting said ester to freezing temperature so as to form a mixture of liquid and solid, the latter amounting to 50 to 95% of the mixture, and separating the liquid fraction containing the color-generating impurities from the solid fraction of said ester.

2. A process for removing color-generating impurities from an ester of α-chloroacrylic acid, which comprises freezing the ester containing said impurities, partially melting the solid mass until 5 to 50% thereof has liquefied, and separating the liquid fraction containing color-generating impurities from the solid fraction of said ester.

3. A process for removing color-generating impurities from an ester of α-chloroacrylic acid, which comprises subjecting the liquid ester containing said impurities to freezing temperature until 50 to 95% thereof has solidified, and separating the liquid fraction containing said impurities from the solid fraction of the ester.

4. A process for removing color-generating impurities from an ester of α-chloroacrylic acid, which comprises freezing and partially remelting said ester, and separating successive liquid fractions formed during the remelting operation from the solid fraction, the total amount of liquid thus removed being from 5 to 50% of the impure ester originally frozen.

5. A process for removing color-generating impurities from an ester of α-chloroacrylic acid, which comprises subjecting the contaminated ester to successive operations each involving partial freezing and separation of the liquid fraction from the solid fraction, and remelting of the latter fraction, the remelted solid fraction being subjected to the next partial freezing operation, and the total amount of liquid thus separated from the successive solid fractions being from 5 to 50% of the ester originally employed.

6. A process for removing color-generating impurities from methyl α-chloroacrylate, which comprises freezing the monomeric ester containing said impurities, partially melting the solid mass until 5 to 50% thereof has liquefied, and separating the liquid fraction containing color-generating impurities from the solid fraction of said ester.

7. A process for removing color-generating impurities from methyl α-chloroacrylate, which comprises subjecting the liquid monomeric ester containing said impurities to freezing temperature until 50 to 95% thereof has solidified, and separating the liquid fraction containing said impurities from the solid fraction of the ester.

WILLIAM O. NEY, Jr.

References Cited in the file of this patent

UNITED STATES PATENTS

| Number | Name | Date |
|---|---|---|
| 2,247,790 | Strain et al. | July 1, 1941 |
| 2,314,443 | Crawford et al. | Mar. 23, 1943 |
| 2,354,895 | Ward | Aug. 1, 1944 |
| 2,465,991 | Anderson et al. | Apr. 5, 1949 |